(12) United States Patent
Lotveit

(10) Patent No.: US 7,789,118 B2
(45) Date of Patent: Sep. 7, 2010

(54) GLIDING PREVENTER FOR VEHICLE WHEELS

(75) Inventor: Bard Lotveit, Klokkarstua (NO)

(73) Assignee: Autosock AS, Oslo (NO)

( * ) Notice: Subject to any disclaimer, the term of this patent is extended or adjusted under 35 U.S.C. 154(b) by 200 days.

(21) Appl. No.: 11/311,457

(22) Filed: Dec. 19, 2005

(65) Prior Publication Data

US 2006/0090825 A1 May 4, 2006

Related U.S. Application Data

(62) Division of application No. 09/937,591, filed as application No. PCT/NO00/00113 on Apr. 6, 2000, now Pat. No. 7,013,548.

(51) Int. Cl.
*B60C 11/00* (2006.01)
(52) U.S. Cl. .................. 152/221; 152/175; 152/213 R
(58) Field of Classification Search ............. 152/154.2, 152/170–173, 175, 213 R, 213 A, 216–219, 152/221
See application file for complete search history.

(56) References Cited

U.S. PATENT DOCUMENTS

| 710,562 | A | | 10/1902 | DeCaters |
| 871,575 | A | | 11/1907 | Dorgan |
| 880,274 | A | * | 2/1908 | Brophy ........................ 152/175 |
| 1,342,753 | A | | 6/1920 | McGeorge |
| 1,382,045 | A | | 6/1921 | Zigler |
| 1,710,808 | A | | 4/1929 | Borman |
| 1,910,416 | A | | 5/1933 | Wollheim |
| 1,967,522 | A | | 7/1934 | Wengard |
| 2,341,316 | A | | 2/1944 | Ederer |
| 2,343,498 | A | | 3/1944 | Dunagan |
| 2,392,577 | A | | 1/1946 | Castricum |
| 2,524,551 | A | | 10/1950 | Tolbert |
| 2,682,907 | A | * | 7/1954 | Krueger ........................ 152/222 |
| 2,747,639 | A | * | 5/1956 | Mertz ........................ 152/173 |

(Continued)

FOREIGN PATENT DOCUMENTS

CA 1022444 12/1977

(Continued)

OTHER PUBLICATIONS

Marketing Materials of SIEPA of a Device, Winter 1984/1985.

*Primary Examiner*—Jason R Bellinger
(74) *Attorney, Agent, or Firm*—Carmody & Torrance LLP

(57) ABSTRACT

A device to be fitted on a vehicle wheel in order to increase the friction between the wheel and the road surface during winter conditions, comprises a belt that can encircle the tread of the wheel and be held in place by means of flexible inner and outer side portions. The inner side portion is tightened on the inner side of the wheel by means of an elastic member. The internal circumference of the belt is at least 4% larger, preferably 5-6% larger than the largest circumference of the wheel. The belt can be made substantially of a woven polyamide material. The outer side portion of the device can be fully covering or be provided with one or more openings, and may in addition be provided with radially extending straps in order to facilitate fitting the device to the vehicle wheel or removing it therefrom. A method for such fitting without lifting the wheel from the road surface is also disclosed.

38 Claims, 7 Drawing Sheets

U.S. PATENT DOCUMENTS

| | | | |
|---|---|---|---|
| 2,777,497 A * | 1/1957 | Hildebrant | 152/175 |
| 2,961,025 A | 11/1960 | White | |
| 3,007,506 A | 11/1961 | Bowler | |
| 3,335,776 A | 8/1967 | Peterson | |
| 3,770,035 A * | 11/1973 | Haye, Sr. | 206/304.1 |
| 3,797,549 A | 3/1974 | Lieberum | |
| 3,934,633 A | 1/1976 | Bula | |
| 4,074,742 A * | 2/1978 | Chamblin | 152/154.2 |
| 4,111,251 A | 9/1978 | Bula | |
| 4,287,925 A | 9/1981 | Spann | |
| 4,308,906 A | 1/1982 | Bula | |
| 5,044,411 A | 9/1991 | Doll | |
| 5,439,727 A * | 8/1995 | Riggs et al. | 428/128 |
| 5,624,509 A | 4/1997 | Stanley | |
| 6,026,876 A * | 2/2000 | Snyder | 152/218 |
| 6,709,138 B1 * | 3/2004 | Johnson | 362/500 |
| 7,013,548 B1 * | 3/2006 | Lotveit | 29/450 |

FOREIGN PATENT DOCUMENTS

| | | |
|---|---|---|
| CH | 208273 | 1/1940 |
| DE | 21 08 386 | 8/1972 |
| DE | 23 55 291 | 5/1975 |
| DE | 24 38 925 | 2/1976 |
| DE | 26 08 190 | 8/1977 |
| DE | 29 26 569 | 1/1980 |
| DE | 32 36 181 A1 | 4/1984 |
| EP | 0 007 202 A1 | 1/1980 |
| EP | 0 345 389 A1 | 12/1989 |
| FR | 2 249 782 | 5/1975 |
| FR | 2 281 825 | 3/1976 |
| FR | 2 756 494 | 6/1998 |
| GB | 110261 | 10/1917 |
| GB | 184107 | 8/1922 |
| GB | 2 061 201 A | 5/1981 |
| GB | 2 152 449 A | 8/1985 |
| GB | 2 230 495 A | 10/1990 |
| GB | 2 305 402 | 4/1997 |
| IT | 273339 | 4/1930 |
| JP | 48-38642 | 11/1973 |
| JP | 59-160607 | 9/1984 |
| JP | 60-157907 | 8/1985 |
| JP | 60-180608 | 11/1985 |
| JP | 62-001607 | 1/1987 |
| JP | 01-249503 | 10/1989 |
| JP | 03-032909 | 2/1991 |
| JP | 04-031111 A | 2/1992 |
| JP | 06-306730 A | 11/1994 |
| JP | 07-156622 | 6/1995 |
| JP | 09-156332 | 6/1997 |
| JP | 09-216506 | 8/1997 |
| WO | 86/00579 | 1/1986 |
| WO | 93/12944 | 7/1993 |

* cited by examiner

GLIDING PREVENTER FOR VEHICLE WHEELS

CROSS REFERENCE TO RELATED APPLICATIONS

This application is a divisional of U.S. application Ser. No. 09/937,591, filed Sep. 27, 2001, now U.S. Pat. No. 7,013,548, which is a National Stage of International Application No. PCT/N000/00113, filed Apr. 6, 2000.

BACKGROUND OF THE INVENTION

The present invention relates to a device to be fitted on a vehicle wheel of a predetermined size in order to increase the friction between the wheel and the road surface during winter conditions, comprising a belt made substantially from textile material and intended to encircle the tread of the wheel and be held in place by means of flexible inner and outer side portions which, at least on the inner side of the wheel, is tightened by means of an elastic member.

Such a device is known from U.S. Pat. No. 2,682,907, FIGS. 1-3. This known device is symmetrical about its middle plane and is made from a single piece of coarse canvas, which is folded over so that along either of the two outer edges a continuous pocket is formed which receives an elastic member in the form of a helical spring.

The middle portion of the device, which is supposed to constitute the belt to come into contact with the road surface, is by means of glue provided with a coating of aluminium oxide impregnated with abrasive particles in order to substantially increase the friction against the road surface.

The device according to U.S. Pat. No. 2,682,907 is formed to cling quite closely to the vehicle wheel and cannot be put in place on the wheel when the wheel is mounted on a vehicle unless the wheel is raised from the ground. Since the device is symmetrical with flexible side portions having springs included on both sides, the device, e.g. when driving through a curve on a dry road surface, conceivably could creep off the wheel towards the inside thereof and impede the steering mechanism of the vehicle, possibly also damage brake lines. Once the device has moved to the inner side of the wheel, it cannot be removed without destroying the device or removing the wheel from the vehicle.

SUMMARY OF THE INVENTION

A purpose of the present invention is to provide a device mentioned in the introductory paragraph, which may be fitted to the wheel of the vehicle even when the wheel is resting on the road surface with the full weight of the vehicle, preferably also when the wheel is stuck in more or less deep snow.

This is obtained according to the invention by making the internal circumference of the belt at least 4% larger than the largest circumference of the wheel. Very surprisingly, it has been found that such an oversize makes it possible to fit the inner side portion over the tread of the wheel to the inner side of the wheel along such a long part of the circumference of the wheel not being in contact with the road surface that, when the wheel thereafter is rotated, e.g. by attempting to drive the car forwards or backwards, the remaining part of the inner side portion will assume its place on the inner side of the wheel and pull the belt in place along the tread of the wheel.

It has also surprisingly been found that with this over-size, which can be permitted to amount up to 8% or more, somewhat depending on the space conditions in the wheel well of the vehicle, the device will stay in place on the wheel even when driving on a clear and winding road at speeds at least as high as common snow chains would permit.

A second purpose of the invention is to provide a device of the type mentioned in the introductory paragraph which will not be able to shift on the wheel so that dangerous driving situations occur.

This is obtained according to the invention by the outer side portion of the device being shaped so that it will not be able to jump over the wheel to the inner side thereof. Here, the outer side portion may e.g. cover the entire outer side of the wheel, or it may be provided with one or more openings, the largest circumference of such an opening being less than 2.2 times the largest diameter of the wheel. Where the outer side portion is so narrow that its opening becomes larger than this, the opening can be limited by means of radially extending straps. These straps may also be suitable as gripping means when the device is to be removed from the wheel after use.

A further purpose of the present invention is to provide a method for fitting a device according to the invention to a vehicle wheel while the wheel is mounted on the vehicle and possibly also is stuck in snow.

This is obtained according to the invention in that the inner side portion is fitted over the tread of the wheel to the inside of the wheel along at least two thirds of the circumference of the wheel, preferably along as much as possible of that part of the circumference which does not rest against the road surface, whereupon the wheel is rotated by means of the vehicle, whereby the remaining part of the inner side portion moves to assume its place on the inside of the wheel and pulls the belt in place along the tread of the wheel.

BRIEF DESCRIPTION OF THE DRAWINGS

Further advantageous features of the invention will appear from the following description of the exemplifying embodiments schematically shown on the dependent drawings, wherein.

In the various embodiments shown in the above mentioned figures, the same reference numerals have been used on like or corresponding parts.

DETAILED DESCRIPTION OF THE PREFERRED EMBODIMENTS

Figure 1A:
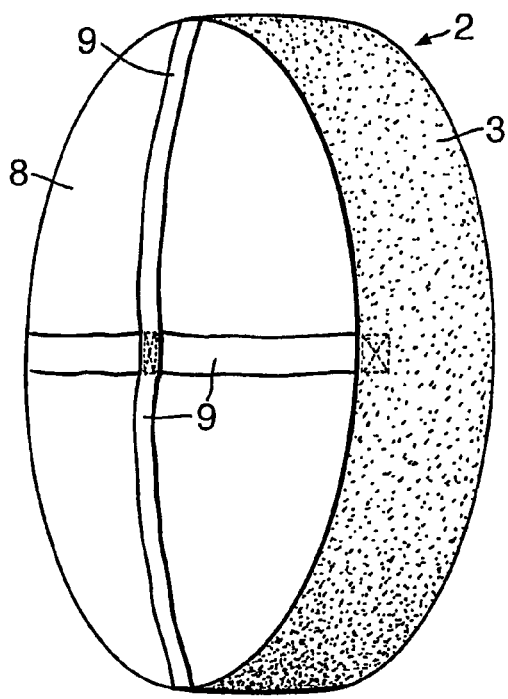
FIGS. 1A, B, C are a perspective view of a vehicle wheel provided with a first device according to the invention seen from the outside, a perspective view of the wheel in FIG. 1A seen from the inner side, and a partial radial cross-section through the wheel in FIG. 1A, respectively.
Figure 1B:
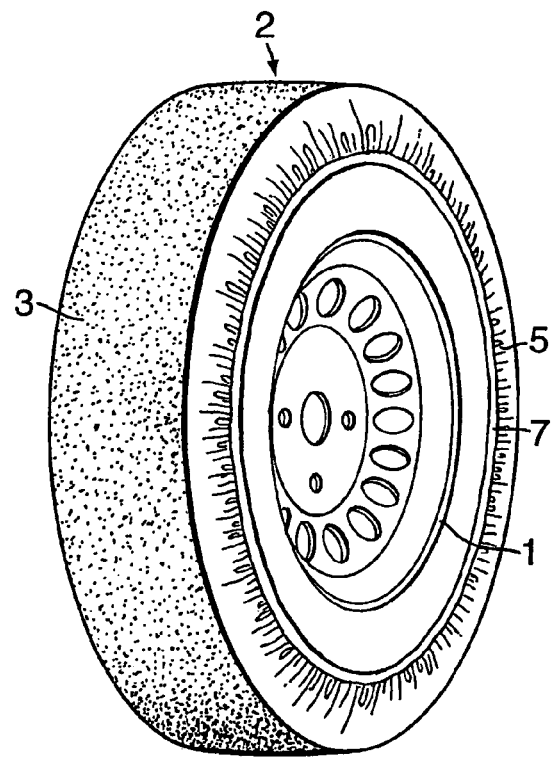
Figure 1C:
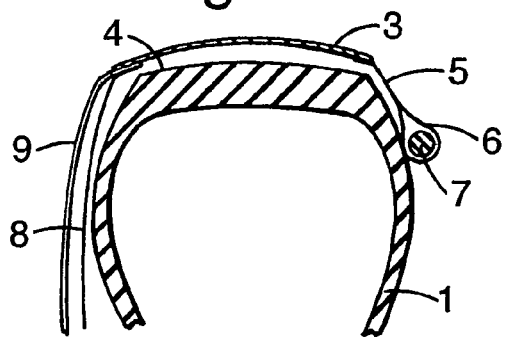

FIGS. 1A-C shows a vehicle wheel 1 provided with a first embodiment of the device according to the invention. This device 2 comprises a belt 3 which is to encircle the tread 4 of the wheel with a certain clearance therebetween over at least a part of the portion of the belt 3 which is not located between the wheel and the road surface. This clearance results from the inner circumference of the belt being 4-10%, preferably 5-6% larger than the largest circumference of the wheel 1. The belt 3 may consist of a textile material, preferably made of a polymer. A woven textile of polyamide has turned out to be particularly suitable, combining high strength with very good adhesion to a snow covered surface. One such material is commercially available under the trade name Cordura® 1000.

On the side of the belt 3 facing the tread of the wheel 4 its textile material may advantageously be coated with a suitable plastic, e.g. polyurethane rubber, in order to strengthen and stabilize the material and reduce the friction against the tread of the wheel.

Even though a woven textile has been found suitable as belt material, it will be understood that also other materials can turn out to be suitable, e.g. more or less stabilized felt materials. It will also be understood that the outer side of the belt may be provided with a friction increasing coating. The device according to the invention can be made reversible, the belt on one side having a surface which is suitable for driving on snow, while the other side has a surface for better gripping ability on ice.

Furthermore, the device 2 is provided with an inner side portion 5 which in the embodiment shown consists of a lighter and more flexible textile material than the belt 3 and which is sewn or in another suitable way is attached to the belt 3 along one of its longitudinal edges. The inner side portion may on its inside advantageously be provided with a low friction coating, preferably silicone polymer, butadiene rubber, neoprene rubber, PVC or similar polymer. Such a low friction coating makes it easier to fit the device 2 in place on the wheel 1 during the mounting.

The free edge of the inner side portion 5 is provided with a longitudinal pocket 6, in which an elastic element 7 is placed, here in the form of a multi-thread rubber band covered by a sheathing spun of relatively smooth thread material. The purpose of the sheathing is, firstly, to reduce the stretchability of the rubber band and, secondly, to reduce the friction between the rubber band and the inside of the pocket 6. The low friction on this point is important for the unhindered adaptation of the rubber band in the pocket 6 when the rubber band is stretched during the fitting of the device onto the tire and for reducing the potentially destructive friction forces when the pocket with the rubber band is driven over by the wheel 1 during the last phase of the fitting of the device 2. (It will be understood that the spring shown in U.S. Pat. No. 2,682,907 and its pocket easily will be damaged if it were to be driven over in such a way.)

From FIG. 1A it appears that on its outer side the device 2 is provided with a fully covering side portion 8. It is also made of a partly coated textile material, e.g. of the type Cordura®, but in a lighter quality than the belt 3.

The outer side portion is provided with two diametrically extending orthogonal straps 9, which in addition to being attached to the outer side portion and possibly also the belt 3 at their ends, also are attached to each other and to the middle of the outer side portion 8. The straps 9 serve the purpose of facilitating removal of the device 2 after use and will, in addition, have a reinforcing effect. It will be understood that the straps 9 may be arranged in different numbers, e.g. three radial straps may be used. The straps may also advantageously be made of a polymer so that the entire device 2 will consist of materials that neither rust nor rot if it is stored in a wet condition.

Figure 2A:
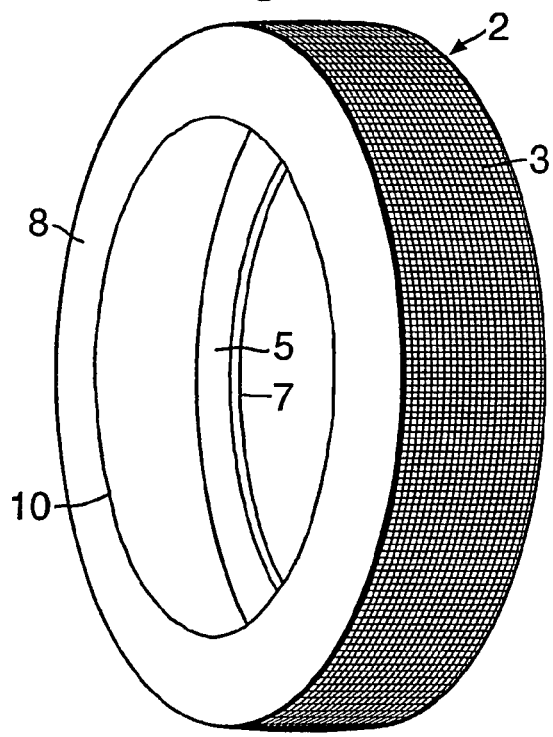
FIGS. 2A, B, C are views similar to FIGS. 1A, B, C of a second embodiment of the invention, except that the wheel is removed from FIGS. 2A and 2B.
Figure 2B:
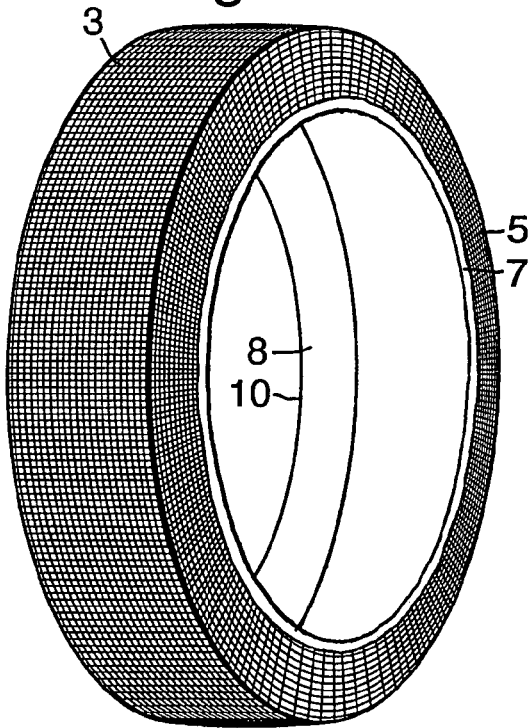
Figure 2C:
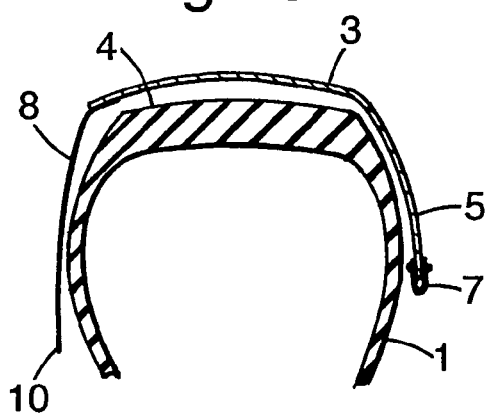

In FIGS. 2A-C there is shown a second exemplifying embodiment of a device according to the invention. The belt 3 and the inner side portion 5 are here made of one and the same piece of textile material. The elastic member 7 is constituted by a band which is woven, spun or knitted from a rubber elastic thread material and a substantially inelastic thread material, so that the latter thread material limits the extendability of the elastic member 7. The band can have a width of about 5 cm and be of a type which is used for suspenders or belts. The band is doubled and is in tensioned condition sewn to the free edge of the inner side portion 5. This avoids a pocket with a concealed rubber band that cannot be inspected for damage or wear.

In this case the outer side portion 8 has a relatively large central opening. However, the free edge 10 of the side portion 8 has a circumference that is less than 2.2 times the largest diameter of the wheel 1 for which the device is to be used. Considering that the tread 4 of the wheel is about 20% of the diameter of the wheel, an opening limited in this way will not be able to jump over the wheel to bring the device in its entirety on the inner side of the wheel. The free edge 10 can be reinforced in a suitable manner.

Figure 3A:
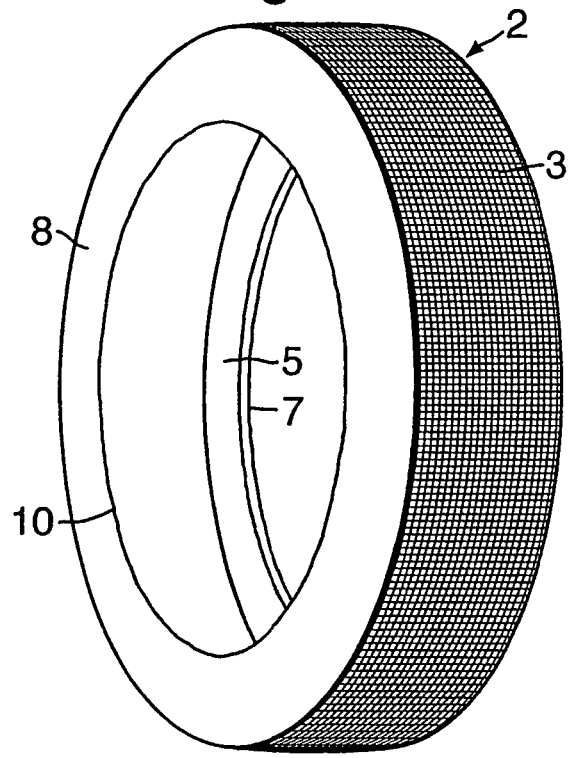
FIGS. 3A, B, C are views similar to FIGS. 2A, B, C of a third embodiment according to the invention.
Figure 3B:
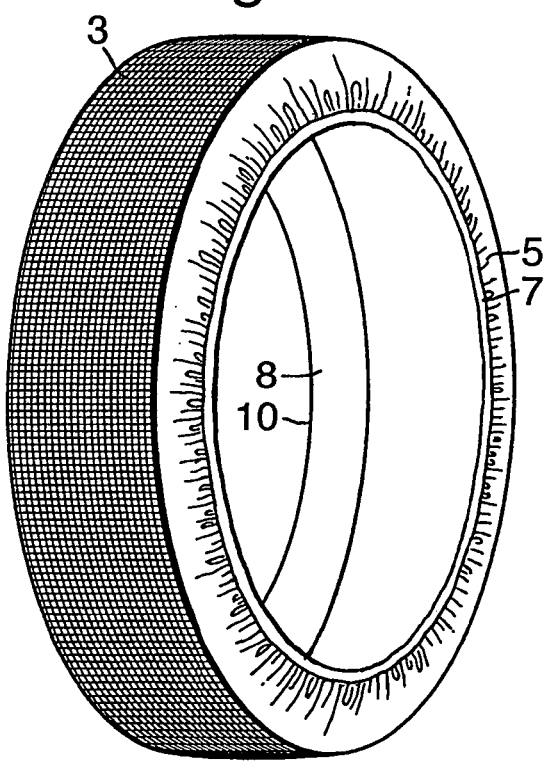
Figure 3C:
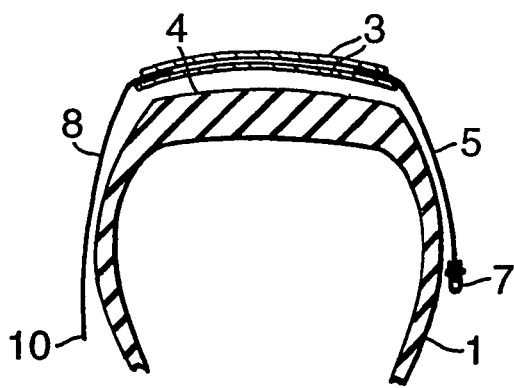

In the third exemplifying embodiment illustrated in FIGS. 3A-C the belt 3 is made of two layers of textile material, e.g. the Cordura® 1000 mentioned above, coated with polyurethane rubber on one side. Here the layers are placed so that the sides coated with polyurethane rubber face each other in the middle portion of the belt. The outer layer will thereby have the possibility of sliding somewhat against the inner layer, the effect being to reduce the strains on the belt when driving on an uneven surface, e.g. over sharp stones.

Here, the inner and outer side portions 5, 8 are sewn to the belt 3 and consist of a textile material of a lighter quality than the belt. The elastic member 7 is a band as described above in connection with the second exemplifying embodiment.

Figure 4A:
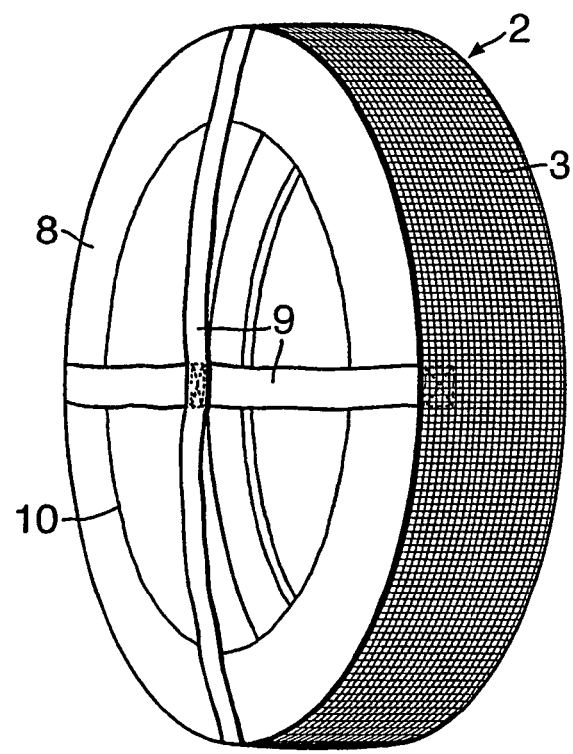
FIGS. 4A, B to 7A, B are views similar to FIGS. 2A and 2B of a fourth to seventh embodiment, respectively, of the device according to the invention.
Figure 4B:
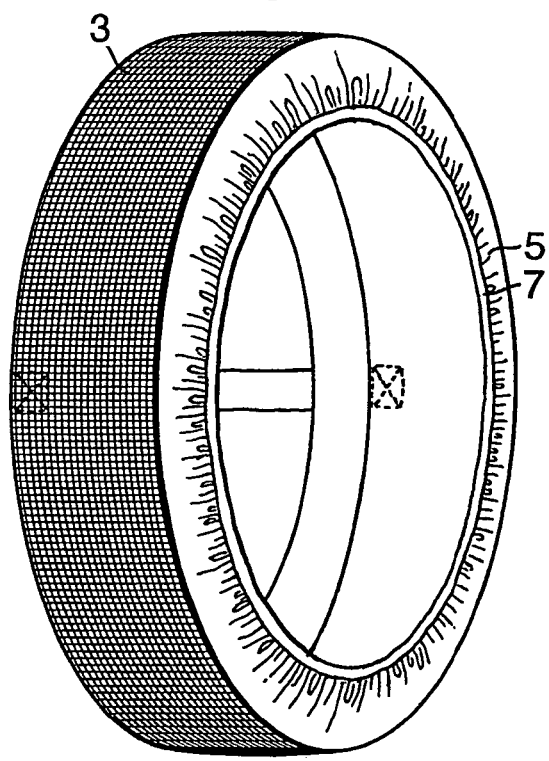

FIGS. 4A, B show an exemplifying embodiment similar to that of FIGS. 3A-C, except that the outer side portion 8 is provided with two crossed straps 9, as is also shown in connection with FIG. 1A.

Figure 5A:
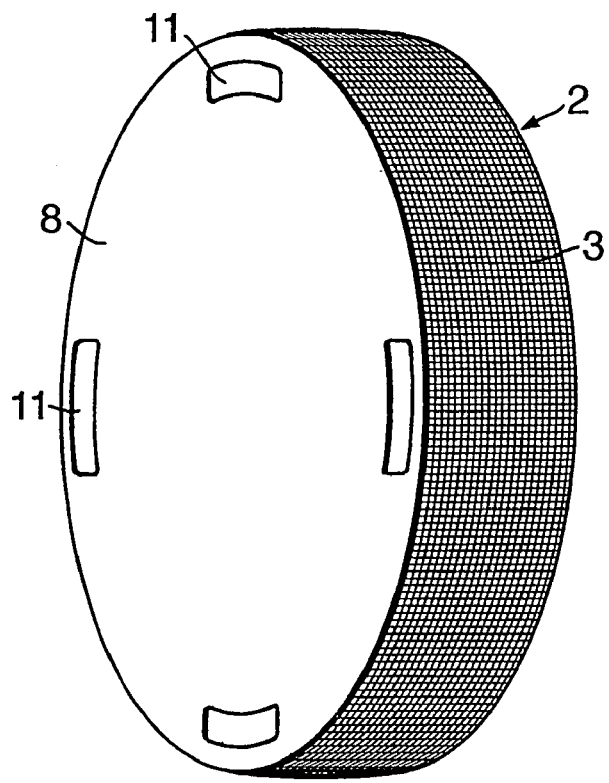
Figure 5B:
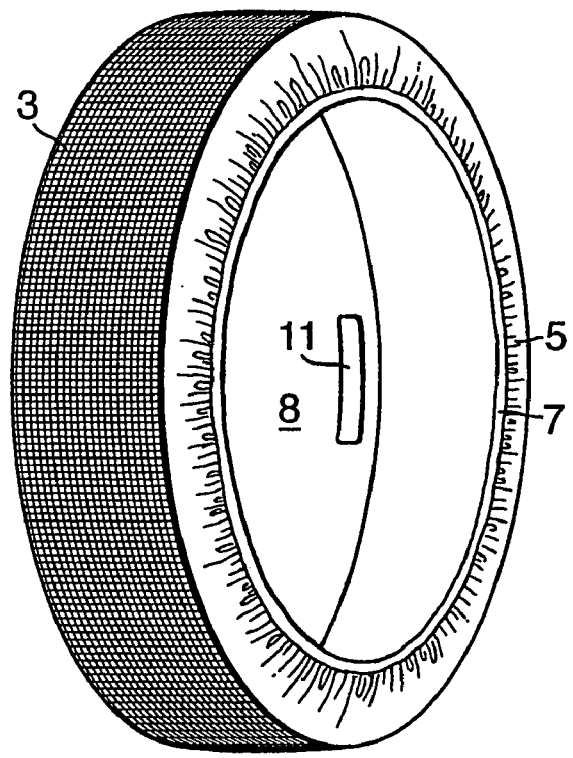

In the fifth exemplifying embodiment shown in FIGS. 5A, B the outer side portion 8 is essentially fully covering, but is provided with four openings 11 which are large enough to serve as grips when the device 2 is to be stabilized during mounting or pulled off after use.

Figure 6A:
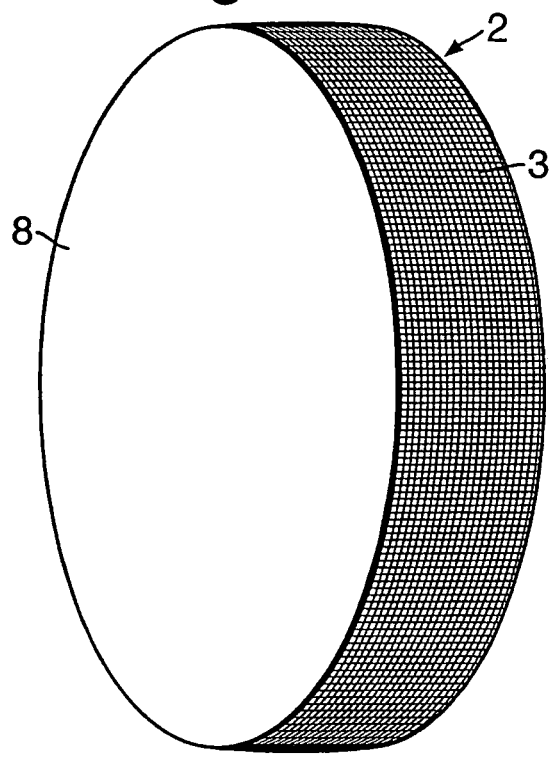
Figure 6B:
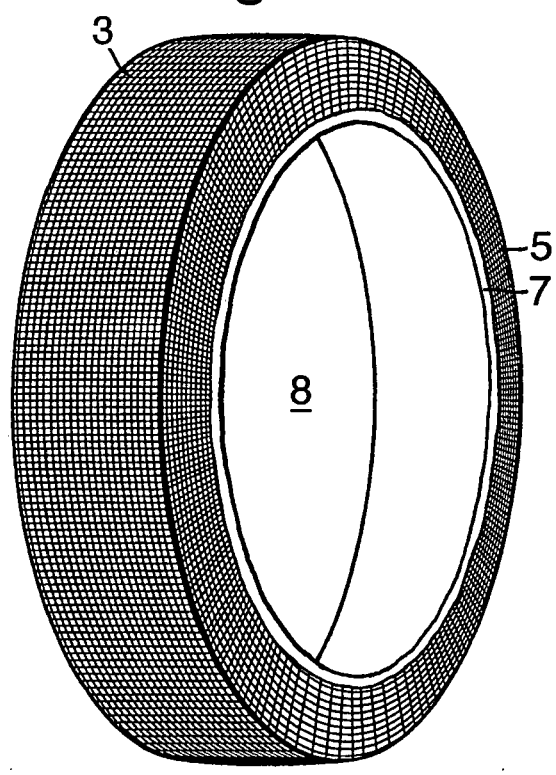

FIGS. 6A, B shows an exemplifying embodiment where the belt 3 and the inner side portion 5 is constituted by one and the same textile material, while the outer side portion 8 is fully covering.

Figure 7A:
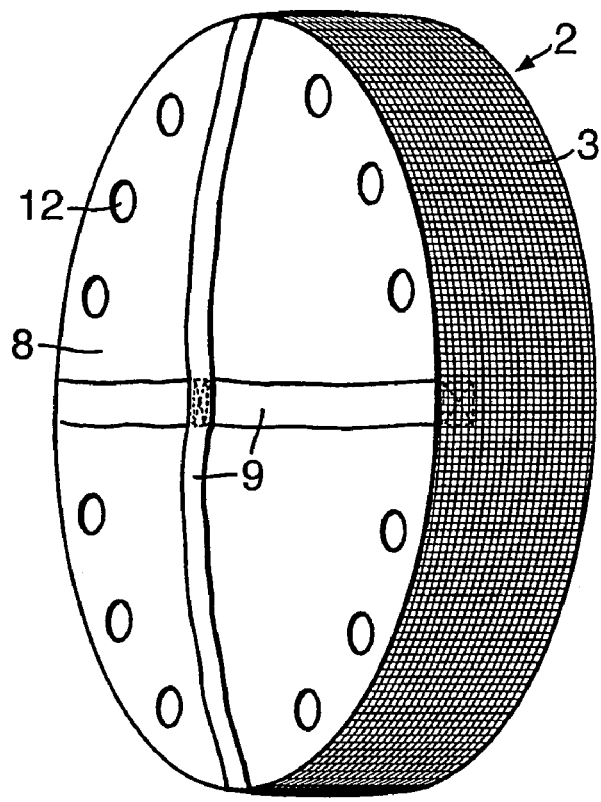
Figure 7B:
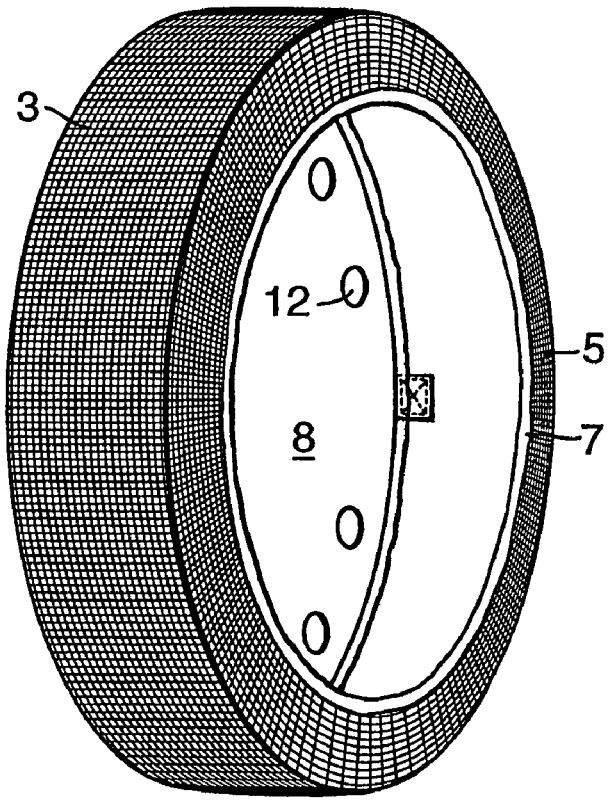

The exemplifying embodiment in FIGS. 7A, B has its starting point in the example of FIGS. 6A, B, but the outer side portion 8 is provided with ventilation holes 12 along the outer edge and also two crossed straps 9. During driving the outer side portion 8 may have a tendency to act as a centrifugal pump so that the device 2 is inflated. This effect may be advantageous when driving in loose snow because the air blown out along the free edge of the inner side portion 5 prevents the snow from penetrating into the device 2. If, on the other hand it is desirable that the device cling closer to the wheel, e.g. in case of narrow space conditions in the wheel well, the ventilation holes 12 may be advantageous.

Further development of the invention has suggested that the outer side portion of the device preferably may be made from a netting material, thus obviating any additional ventilation holes. For example, the netting may be made of PVC coated 1100 dtex polyester multifilament material. The netting openings may have an opening side length of 2-7 mm, preferably about 4 mm. Furthermore, there is reason to believe that polyester may be a suitable material also for the belt 3 of the device according to the invention. One envisions a belt of a multilayer construction, the outer surface comprising polyester multifilament yarn oriented crosswise to the circumferential direction of the belt. The yarn may have a fineness of about 1100 dtex, and the layer construction pattern could be 4-shed broken twill.

Furthermore, it is envisioned that the multilayer construction has an inner layer with a colour or colour pattern which is different from that of the outer layer or layers. Such a differently coloured inner layer, which may be made of polyester or polyamide, will appear when the outer layers are worn through and thereby serve as a wear indicator helping to prevent the situation where the device would separate in the circumferential direction into two parts.

Finally, it is envisioned that the outer and inner layers of the belt are interconnected by a common yarn system in said circumferential direction. Also in this case a yarn of polyester multifilament of about 1100 dtex is expected to be suitable.

It will be understood that according to the invention, a device has been provided which is simple and inexpensive to produce. It is environmentally desirable since it does not cause noise and vibrations or wear on the road surface during use and also since it is made of recyclable materials. The device provides good gripping ability on dry and wet snow and ice, even better than a good studded tire. It is very simple to fit onto and remove from the wheel, and it is comfortable to handle even in cold weather. Even though the device primarily is intended for use in difficult driving situations of a temporary nature, it has proven itself to be very durable. Thus, a prototype mounted on the driven wheels of a vehicle was driven a distance of 30 km at speeds varying between 60 and 70 km per hour, mostly on dry asphalt, which gives the highest wear. Both devices kept stably in place and were intact after the driving. Nevertheless, should the entire or parts of the device for one reason or another fall off during driving, due to its limited weight and soft character it will not do much damage to the vehicle or the surroundings. It will also be understood that the device according to the invention is not limited to the exemplifying embodiments described above, but that it may be modified and varied by the skilled person within the scope of the appended claims.

The invention claimed is:

1. A device for increasing friction between a vehicle wheel and a road surface during winter driving conditions when the vehicle wheel is mounted on a vehicle and rests on a road surface, the device comprising:
    a continuous belt intended to encircle the largest circumference of the wheel;
    a flexible inner side portion that is fittable over the largest circumference of the wheel along a substantial portion thereof that is not in contact with the road surface and capable of pulling the continuous belt into position over the remaining portion of the largest circumference of the wheel as the wheel is rotating while remaining in contact with the road surface, such that the portion of the largest circumference of the wheel that was in contact with the road surface prior to rotation of the wheel is no longer in contact with the road surface due to the rotating of the wheel; and
    a flexible outer side portion disposed against the outer side surface of the wheel when the device is fitted on the wheel;
    wherein at least the flexible inner side portion has an elastic member; and
    wherein the flexible inner side portion is capable of being tightened against an inner side surface of the wheel by the elastic member when the device is fitted over the wheel.

2. A device according to claim 1, wherein the flexible outer side portion of the device is designed to cover substantially the outer side surface of the wheel.

3. A device according to claim 2, wherein the outer side portion of the device is made of a netting material.

4. A device according to claim 1, wherein the outer side portion of the device has at least one opening, the largest circumference of said opening being less than 2.2 times the largest diameter of the wheel.

5. A device according to claim 1, wherein the outer side portion of the device is provided with radially extending straps.

6. A device according to claim 1, wherein said elastic member comprises a rubber-elastic material which is covered by a spun, woven or knitted substantially inelastic thread material, said thread material limiting the extensibility of said elastic member.

7. A device according to claim 1, wherein the continuous belt comprises two layers of textile material, one side of each layer being coated with a suitable plastic, the two layers being arranged so that the plastic coatings contact one another along substantially the entire length of the continuous belt.

8. A device according to claim 1, wherein the continuous belt is of a multilayer construction, the outer surface comprising polyester multifilament yarn oriented crosswise to the circumferential direction of the belt.

9. A device according to claim 8, wherein the polyester multifilament yarn has a fineness of about 1100 dtex.

10. A device according to claim 8, wherein the inner layer of the multilayer construction is a different color than that of the outer layer.

11. A device according to claim 10, wherein the layers are made of a polyester or polyamide multifilament material.

12. A device according to claim 10, wherein the outer and inner layers are interconnected by a common yarn system in said circumferential direction.

13. A device according to claim 12, wherein the said common yarn system is made of a polyester multifilament having a fineness of about 1100 dtex.

14. A device according to claim 1, wherein the inside of the flexible inner side portion of the device is coated by a low friction coating.

15. A device according to claim 14, wherein said low friction coating is one selected from the group consisting of: silicone polymer, butadiene rubber, neoprene rubber, and PVC.

16. A device according to claim 3, wherein the netting material is a PVC coated 1100 dtex polyester multifilament material having a netting opening of 2-7 mm.

17. A device according to claim 1, wherein the outer side portion radially extends from an internal circumference of the belt toward the center of the wheel over a length which equals at least 17% of the largest internal diameter of the belt.

18. A device according to claim 1, wherein an outer surface of said continuous belt is uncoated.

19. The device according to claim 18, wherein the belt is made substantially from a polymer textile material.

20. The device according to claim 18, wherein the belt is made substantially from a polyester textile material.

21. The device according to claim 1, wherein the inner side portion is connected to the continuous belt at a second longitudinal edge.

22. The device according to claim 18, wherein the inner side portion is connected to the belt at a second longitudinal edge.

23. A combination of a device and a vehicle wheel, the wheel being of a predetermined size having an outer circumference and inner and outer side surfaces, the device comprising:
    a belt made substantially from textile material and intended to encircle the outer circumference of the wheel;
    a flexible inner side portion; and a flexible outer side portion which is disposed against the outer side surface of the wheel when the device is fitted on the wheel, the outer side portion being shaped and configured so that the device is maintained in position on the wheel;

wherein only the flexible inner side portion has an elastic member, the flexible inner side portion being tightened against the inner side surface of the wheel by the elastic member when the device is fitted on the wheel; wherein the outer side portion is connected to the belt at a first longitudinal edge; and wherein the internal circumference of the belt is at least 4% larger than the largest circumference of the wheel.

24. The combination according to claim 23, wherein the internal circumference of the belt is 4-10% larger than the largest circumference of the wheel.

25. The combination according to claim 23, wherein the outer side portion has at least one opening, the largest circumference of said opening being less than 2.2 times the largest diameter of the wheel.

26. The combination according to claim 23, wherein an outer surface of said belt is uncoated.

27. A device for increasing friction between a vehicle wheel and a road surface during winter driving conditions when the vehicle wheel is mounted on a vehicle and rests on a road surface, the device comprising:

a continuous belt made substantially from textile material, wherein the textile material is exposed on the outer side of the belt;

a flexible inner side portion that is fittable over the largest circumference of the wheel along a substantial portion thereof that is not in contact with the road surface and capable of pulling the continuous belt into position over the remaining portion of the largest circumference of the wheel as the wheel is rotating while remaining in contact with the road surface, such that the portion of the largest circumference of the wheel that was in contact with the road surface prior to rotation of the wheel is no longer in contact with the road surface due to the rotating of the wheel; and a flexible outer side portion disposed against the outer side surface of the wheel when the device is fitted on the wheel;

wherein at least the flexible inner side portion has an elastic member; and wherein the device is capable of being tightened against an inner side surface of the wheel by the elastic member when the device is fitted over the wheel.

28. The device according to claim 1, wherein said elastic member is a band which is woven, spun or knitted from a rubber elastic thread material and a substantially inelastic material, and which is folded about and attached to a free edge of said inner side portion.

29. The device as claimed in claim 1, wherein only the flexible inner side portion has an elastic member.

30. The device as claimed in claim 1, wherein the continuous belt is made substantially from textile material.

31. The device as claimed in claim 30, wherein the wheel includes a wheel tread and wherein when the device is fitted over the wheel, the continuous belt encircles the tread and is maintained in position by at least the flexible inner portion and flexible outer portion.

32. The device as claimed in claim 1, wherein the wheel includes a wheel tread and wherein when the device is fitted over the wheel, the continuous belt encircles the tread and is maintained in position by at least the flexible inner portion and flexible outer portion.

33. A combination of a device and a vehicle wheel, the wheel being of a predetermined size having an outer circumference and inner and outer side surfaces, the device comprising:

a continuous belt made substantially from textile material and intended to encircle the outer circumference of the wheel, wherein textile material is exposed on an outer surface of the continuous belt;

a flexible inner side portion; and a flexible outer side portion which is disposed against the outer side surface of the wheel when the device is fitted on the wheel, the outer side portion being shaped and configured so that the device is maintained in position on the wheel;

the flexible inner side portion being tightened against the inner side surface of the wheel by the elastic member when the device is fitted on the wheel; wherein the outer side portion is connected to the belt at a first longitudinal edge.

34. The combination according to claim 33, wherein the continuous belt is made substantially from a polymer textile material.

35. The combination according to claim 33, wherein the continuous belt comprises two layers of textile material, one side of each layer being coated with a suitable plastic, the two layers being arranged so that the plastic coatings contact one another along substantially the entire length of the continuous belt.

36. A device for increasing friction between a vehicle wheel and a road surface during winter driving conditions when the vehicle wheel is mounted on a vehicle and rests on a road surface, the device comprising:

a continuous belt made substantially from textile material intended to encircle the tread of the vehicle wheel, wherein the textile material is exposed on the outer side of the belt;

a flexible inner side portion that is fittable over the largest circumference of the tread of the wheel along a substantial portion thereof that is not in contact with the road surface and capable of pulling the continuous belt into position over the remaining portion of the largest circumference of the wheel as the wheel is rotating while remaining in contact with the road surface, such that the portion of the largest circumference of the wheel that was in contact with the road surface prior to rotation of the wheel is no longer in contact with the road surface due to the rotating of the wheel; and a flexible outer side portion disposed against the outer side surface of the wheel when the device is fitted on the wheel, wherein the flexible outer side portion of the device is made of a netting material;

wherein at least the flexible inner side portion has an elastic member; and wherein the flexible inner side portion device is capable of being tightened against an inner side surface of the wheel by the elastic member when the device is fitted over the wheel.

37. The device according to claim 36, wherein the flexible outer side portion of the device is designed to cover substantially the outer side surface of the wheel.

38. The device according to claim 36, wherein the netting comprises openings having a side length of 2 to 7 mm.

* * * * *

UNITED STATES PATENT AND TRADEMARK OFFICE
CERTIFICATE OF CORRECTION

PATENT NO. : 7,789,118 B2 Page 1 of 1
APPLICATION NO. : 11/311457
DATED : September 7, 2010
INVENTOR(S) : Bard Lotveit It is certified that error appears in the above-identified patent and that said Letters Patent is hereby corrected as shown below:

Title Page - insert
--(30) Foreign Application Priority Data
April 6, 1999 (NO) 991631--

Signed and Sealed this

Thirtieth Day of November, 2010

David J. Kappos
*Director of the United States Patent and Trademark Office*